United States Patent [19]

Cherukuri et al.

[11] Patent Number: 5,080,910
[45] Date of Patent: Jan. 14, 1992

[54] STABILIZED CHLORODEOXYSUGAR SWEETENING AGENTS IN POWDER FORM AND METHODS FOR PREPARING SAME

[75] Inventors: Subraman R. Cherukuri, Towaco; Steven M. Faust, Stanhope; Krishna P. Raman, Randolph, all of N.J.

[73] Assignee: Werner-Lambert Company, Morris Plains, N.J.

[21] Appl. No.: 523,616

[22] Filed: May 15, 1990

[51] Int. Cl.$^5$ .............................................. A23G 3/30
[52] U.S. Cl. ..................................... 426/3; 426/548; 426/658; 426/804
[58] Field of Search ....................................... 426/3-6, 426/548, 658, 804

[56] References Cited

U.S. PATENT DOCUMENTS

4,820,528  4/1989  Stroz et al. ................................ 426/3
4,927,646  5/1990  Jenner et al. .......................... 426/804
4,959,225  9/1990  Wong et al. ........................... 426/658

Primary Examiner—Jeanette Hunter
Attorney, Agent, or Firm—Craig M. Bell

[57] ABSTRACT

The present invention pertains to stabilized chlorodeoxysugar sweetening agent compositions in powder form which comprises a chlorodeoxysugar derivative and an effective amount of a stabilizing agent wherein the stabilizing agent is capable of forming a stabilizing mixture with the chlorodexoysugar derivative. The stabilized sweetening agent compositions may be used in a wide variety of ingestible products such as chewing gum compositions, hard and soft confections, beverages, and the like. The present invention also pertains to methods for preparing the stabilized sweetening agent compositions and the ingestible products in which they may be used.

37 Claims, 7 Drawing Sheets

FIG-3

FIG-7 SUCRALOSE STABILITY /SUCRALOSE:CELLULOSE BW-300

STABILIZED CHLORODEOXYSUGAR SWEETENING AGENTS IN POWDER FORM AND METHODS FOR PREPARING SAME

BACKGROUND OF THE INVENTION

1. Field of the Invention

This invention pertains to stabilized chlorodeoxysugar sweetening agent compositions in powder form. More particularly, this invention pertains to stabilized chlorodeoxysugar sweetening agent compositions which comprise a chlorodeoxysugar derivative such as chlorodeoxysucrose and chlorodeoxy-galactosucrose derivatives and a stabilizing agent wherein the stabilizing agent is capable of forming a stabilizing mixture with the chlorodeoxysugar derivative. The stabilized sweetening agent compositions may be utilized in a wide variety of ingestible compositions. This invention also pertains to methods for preparing these stabilized sweetening agent compositions and the ingestible compositions in which they may be employed.

2. Description of the Prior Art

Intense sweeteners have a wide range of chemically distinct structures and hence possess varying properties. These intense sweetener compounds include water-soluble artificial sweeteners such as 1,2-benzisothiazol-3(2H)-one 1, 1-dioxide (saccharin and its salts), cyclohexylsulfamic acid (cyclamate and its salts), and the potassium salt of 6-methyl-1,2,3-oxathiazin-4(3H)-one-2,2-dioxide (Acesulfame-K, a commercially available product from Hoechst Celanese Corporation, Somerville, N.J.), proteins such as thaumatin (Talin, a commercially available product of Tate & Lyle Products, Reading, United Kingdom), chlorodeoxysugar derivatives (such as Sucralose, a commercially available product of McNeil Specialty Products Company, Skillman, New Jersey), and dipeptides such as N-L-alpha-aspartyl-L-phenylalanine l-methyl ester (Aspartame, a commercially available product of the Nutrasweet Company, Deerfield, Ill.) and L-alpha-aspartyl-D-alanine N-(2,2,4-tetramethyl-3-thietanyl)amide (Alitame, a commercially available product of Pfizer, New York, N.Y.), and dihydrochalcones. Each of these sweetening agents has a distinct sweetening intensity compared to sucrose and this sweetening intensity is well documented. For example, the following sweetening agents have the sweetening intensities set out below.

| Sweetness Intensities of Various Sweetening Agents | |
|---|---|
| COMPOUND | SWEETNESS INTENSITY* |
| 1, 2-Benzisothiazol-3(2H)-one 1, 1-dioxide (Saccharin and its salts) | 300× |
| Cyclohexylsulfamic acid (Cyclamate and its salts) | 30× |
| N-L-alpha-Aspartyl-L-phenylalanine l-methyl ester (Aspartame) | 180×— 200× |
| Potassium salt of 6-methyl-1,2,3-oxathiazin-4(3H)-one-2,2-dioxide (Acesulfame-K) | 160× 200× |
| 4,1',6'-Trichloro-4,1',6'-trideoxy-galactosucrose (Sucralose) | 600× |
| L-alpha-Aspartyl-N-(2,2,4,4-tetramethyl-3-thietanyl)-D-alaninamide hydrate (Alitame) | 2000× |

*Compared to sucrose.

Because each intense sweetening agent is chemically distinct, each sweetener presents a different challenge with respect to the actual use of such sweetener in ingestible compositions. For example, some intense sweeteners have an associated bitter taste or off-note such as Saccharin (a commercially available product of PMC Specialty Group Inc., Cincinnati, Ohio), stevioside, Acesulfame-K, glycyrrhizin, dipotassium glycyrrhizin, glycyrrhizic acid ammonium salt, and thaumatin (Talin). Other intense sweeteners present stability problems. Aspartame, for example, exhibits instability in the presence of aldehydes, ketones, moisture, and the like. Sucralose, on the other hand, turns dark during storage. This color change occurs at the following rate:

| Temperature | Decomposition Time |
|---|---|
| 75° F. | 18–36 months |
| 86° F. | 3 months |
| 104° F. | 3 weeks |
| 122° F. | 1 week |

This color decomposition of Sucralose is believed to be initiated by exposure of Sucralose to heat and moisture during storage. Generally, decomposition begins slowly and then, once begun, the decomposition reaction accelerates rapidly. Aqueous solutions of Sucralose have been proposed to stabilize the sweetening agent but such solutions add significant amounts of moisture and change the composition of the chewing gum or other edible formulation. These aqueous solutions also tend to require preservatives. Also for some encapsulations, powders are required and such powders should be heat stabilized. A 50:50 mixture of Sucralose and Maltodextrin has also been proposed to increase the stability of Sucralose but such mixtures are dilute and still do not provide satisfactory stability properties.

U.S. Pat. No. 4,435,440, issued to Hough et al. and assigned to Tate and Lyle plc, discloses sweetening agents which comprise chlorodeoxysugar derivatives.

U.S. Pat. No. 4,495,170, issued to Beytes et al. and assigned to Tate and Lyle plc, discloses synergistic sweetening compositions which comprise a mixture of a chlorodeoxysugar and another sweetening agent which has an associated bitter taste. The chlorodeoxysugars are selected from the group consisting of chlorodeoxysucroses and chlorodeoxygalacto-sucroses. The bitter tasting sweetening agent is selected from the group consisting of Saccharin, stevioside and Acesulfame-K.

U.S. patent application Ser. No. 230,282, filed Aug. 9, 1988, to Cherukuri et al. and assigned to Warner-Lambert Company, discloses synergistic sweetening compositions which comprise Sucralose and Aspartame and Sucralose and Alitame. In general, the synergistic sweetening compositions comprise Sucralose and Aspartame, or Sucralose and Alitame, in a ratio by weight from about 65:35 to about 91.7:8.3, respectively.

U.S. patent application Ser. No. 264,248, filed Oct. 28, 1988, to Cherukuri et al. and assigned to Warner-Lambert Company, discloses synergistic sweetening compositions which comprise Sucralose and Maltitol.

PCT patent application serial No. WO 89/03182A, priority date Oct. 6, 1987, to Tate & Lyle plc, discloses synergistic sweetening compositions which comprise Sucralose and a saccharide bulk sweetening agent selected from the group consisting of fructose, glucose, maltose, xylitol, mannitol, and sorbitol.

European Patent Application serial No. 267,809A2 discloses synergistic sweetening compositions which comprise Sucralose and maltodextrin.

U.S. Pat. No. 4,820,528, issued to Stroz et al. and assigned to Nabisco Brands, Inc., discloses a codried composition consisting essentially of about 99.9% to 90% saccharin and about 0.1% to about 10% of a halodeoxysugar, by weight.

United Kingdom patent application No. 2,197,575A, to Jenner and assigned to Tate & Lyle plc, discloses a codried composition consisting of from about 20% to about 80% sucralose and a water-soluble oligosaccharide, by dry weight.

PCT patent application serial No. WO 89/08672A, priority date May 15, 1987, to Yatka et al., discloses a chewing gum composition having controlled sweetness wherein the gum contains an effective amount of Sucralose.

Thus, the above references disclose a variety of combinations of sweetening agents which have specific sweetness intensities compared to sucrose. None of the above references, however, disclose a stabilized chlorodeoxysugar sweetening agent composition in powder form. Such stabilized sweetening agent compositions could be stored for longer periods of time and could be processed at higher temperatures. The present invention provides such stabilized chlorodeoxysugar sweetening agent compositions in powder form and the sweetened ingestible compositions and chewing gum products in which the stabilized sweetening agent compositions may be used.

SUMMARY OF THE INVENTION

The present invention pertains to stabilized chlorodeoxysugar sweetening agent compositions in powder form which comprise a chlorodeoxysugar derivative and an effective amount of a stabilizing agent wherein the stabilizing agent is capable of forming a stabilizing mixture with the chlorodeoxysugar derivative. The stabilized sweetening agent compositions may be used in a wide variety of ingestible products such as chewing gum compositions, hard and soft confections, beverages, and the like. The present invention also pertains to methods for preparing the stabilized sweetening agent compositions and the ingestible products in which they may be used.

DETAILED DESCRIPTION OF THE INVENTION

The present invention pertains to stabilized chlorodeoxysugar sweetening agent compositions in powder form which comprise a chlorodeoxysugar derivative and an effective amount of a stabilizing agent wherein the stabilizing agent is capable of forming a stabilizing mixture with the chlorodeoxysugar derivative. The stabilized sweetening agent compositions may be used in a wide variety of ingestible products such as chewing gum compositions, hard and soft confections, beverages, and the like. The present invention also pertains to methods for preparing the stabilized sweetening agent compositions and the ingestible products in which they may be used.

Applicants have found that the combination of a chlorodeoxysugar and a stabilizing agent results in stabilized chlorodeoxysugar sweetening agent compositions in powder form which have improved stability during storage and at elevated temperatures. While not wishing to be bound by theory, applicants believe that upon being exposed to heat and moisture over a period of time, chlorodeoxysugar derivatives decompose accompanied by generation of chloride or hydrogen chloride ions, or other degradative ions. Such ions can react with adjacent molecules of chlorodeoxysugar derivatives which in turn decompose and generate additional degradative ions. Such chain reactions accelerate the decomposition of chlorodeoxysugar derivatives. The stabilizing agents of the present invention retard this decomposition reaction by a combination of chemical and physical factors. Chemically, the stabilizing agents retard the decomposition reaction by capturing degradative ions or otherwise binding these ions and thereby preventing their reaction with the chlorodeoxysugar molecules. Physically, the stabilizing agents retard the decomposition reaction by acting as a diluent and separating the chlorodeoxysugar molecules from each other and thereby preventing or slowing the reaction of the degradative ions with the adjacent chlorodeoxysugar molecules. Hence, the stabilizing agents retard the decomposition of chlorodeoxysugar derivatives by chemically and physically inhibiting the degradation reaction.

Applicants define the terms "ingestible" and "edible" to include all materials and compositions which are used by or which perform a function in the body. These include materials and compositions which are adsorbed and those which are not absorbed as well as those which are digestible and non-digestible.

The intense sweetening agents (sweeteners) in the present invention are chlorodeoxysugar derivatives. The chlorodeoxysugar derivatives may be selected from the group consisting of chlorodeoxysucrose derivatives, chlorodeoxygalactosucrose derivatives, and mixtures thereof. Examples of chlorodeoxysucrose and chlorodeoxygalactosucrose derivatives include but are not limited to:

(a) 1-chloro-1′-deoxysucrose;

(b) 4-chloro-4-deoxy-alpha-D-galactopyranosyl-alpha-D-fructofuranoside, or 4-chloro-4-deoxygalactosucrose;

(c) 4-chloro-4-deoxy-alpha-D-galactopyranosyl-1-chloro-1-deoxy-beta-D-fructofuranoside, or 4,1'-dichloro-4,1'-dideoxygalactosucrose;
(d) 1',6'-dichloro-1',6'-dideoxysucrose;
(e) 4-chloro-4-deoxy-alpha-D-galactopyranosyl-6-dichloro-1,6-dideoxy-beta-D-fructofuranoside, or 4,1',6'-trichloro-4,1',6'-trideoxygalactosucrose;
(f) 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose;
(g) 6,1',6'-trichloro-6,1',6'-trideoxysucrose;
(h) 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalactosucrose; and
(i) 4,6,1',6'-tetrachloro-4,6,1',6'-tetra-deoxysucrose.

In a preferred embodiment, the chlorodeoxysugar derivative is 4,1',6'-trichloro-4,1',6'-trideoxygalactosucrose ($C_{12}H_{19}Cl_3O_8$, 4-chloro-4-deoxy-alpha-D-galacto-pyranosyl-1,6-dichloro-1,6-dideoxy-beta-D-fructofuranoside) which is commercially available under the tradename Sucralose from McNeil Specialty Products Company, Skillman, N.J. Sucralose is a free-flowing white crystalline solid that is freely soluble in water. Sucralose is prepared from sucrose in a five step process which selectively substitutes three chlorine atoms for three hydroxyl groups.

The intense sweetening agent of the present invention may be used in many distinct physical forms well known in the art to provide an initial burst of sweetness and/or a prolonged sensation of sweetness. Without being limited thereto, such physical forms include free forms, such as spray dried, powdered, and beaded forms, and encapsulated forms, and mixtures thereof.

The stabilizing agents in the present invention are characterized by being in solid form and by having the ability to form a stabilizing mixture with the chlorodeoxysugar derivative so that the stability of the chlorodeoxysugar derivative is increased during storage. Stabilizing agents in the present invention must be capable of retarding the degradation of the chlorodeoxysugar derivative and must not cause such degradation. The stabilizing agents must absorb or bind the degradative ions generated during the degradation reaction of the chlorodeoxysugar derivative and must not cause or induce degradative ion formation. Preferably, the stabilizing agents are not acidic. The stabilizing agents must also be able to dilute the chlorodeoxysugar derivative and preferably have a small particle size. Such stabilizing agents must also be "pharmaceutically acceptable" which means that the agents must be non-toxic to humans and must not have undesirable side effects when administered to humans. Such agents must not adversely affect the sweetness intensity of the chlorodeoxysugar derivative. Thus, a stabilizing agent in the present invention is an agent which binds degradative ions, does not induce degradative ion formation, dilutes the chlorodeoxysugar derivative, is pharmaceutically acceptable, and does not adversely affect the sweetness intensity of the chlorodeoxysugar derivative.

The stabilizing agent of the present invention may be selected from a wide range of solid compounds that retard the degradation of chlorodeoxysugar derivatives. Exemplary stabilizing agents include celluloses, alkali metal salts, inorganic phosphates, and mixtures thereof. In a preferred embodiment, the stabilizing agents may be selected from the group consisting of cellulose BW-300 (which has a particle size of 22 microns and is marketed under the tradename Solka-Floc by James River Corporation), calcium carbonate, dicalcium phosphate, carboxymethyl cellulose (CMC), starch (such as starch marketed under the tradename Capsul by National Starch & Chemical), mannitol, and mixtures thereof. In a more preferred embodiment, the stabilizing agent is cellulose BW-300. In general, most monosaccharides, disaccharides, and polyols are not effective stabilizing agents.

The amount of stabilizing agent present in the stabilized sweetening agent composition is an effective amount of a stabilizing agent. In general, an effective amount of a stabilizing agent is that amount of stabilizing agent which will increase the useful storage life of the chlorodeoxysugar by a factor of at least two fold. In a preferred embodiment, the stabilizing agent is present in the sweetening agent composition in an amount of at least about 10%, preferably from about 10% to about 50%, and more preferably from about 10% to about 30%, by weight of the stabilized sweetening agent composition.

The stabilized sweetening agent compositions of the present invention are prepared by simply admixing a chlorodeoxysugar derivative and a stabilizing agent wherein the stabilizing agent is capable of forming a stabilizing mixture with the chlorodeoxysugar derivative. Simple blending of the solids is generally satisfactory and such techniques as co-drying, encapsulating, spray drying, agglomerating, and hot or cold processing are not necessary.

The combination of the intense sweetener and the stabilizing agent set out above results in a stabilized sweetening agent composition having improved stability in powder form during storage and at elevated temperatures. The stabilizing effect of the present composition is markedly greater than that expected by the mere addition of the stabilizing agent to the intense sweetener. Accordingly, applicants' stabilized sweetening agent compositions have the advantage over conventional compositions of being stable over a longer period of time and under adverse processing conditions.

Once prepared, the inventive stabilized sweetening agent composition may be stored for future use or may be formulated in effective amounts with conventional additives, such as pharmaceutically acceptable carriers or confectionery ingredients to prepare a wide variety of ingestible compositions, such as foodstuffs, beverages, powdered drinks, jellies, extracts, hard and soft confectionery products, tabletop sweeteners, orally administered pharmaceutical compositions, and hygienic products such as toothpastes, dental lotions, mouth washes and chewing gums.

The amount of the inventive stabilized sweetening agent composition employed in an edible composition is an effective amount to sweeten the edible composition. The exact amount of the stabilized sweetening agent composition employed is a matter of preference, subject to such factors as the type of carrier employed in the composition, the other ingredients in the composition, and the strength of sweetness desired. Thus, the amount of sweetener composition may be varied in order to obtain the result desired in the final product and such variations are within the capabilities of those skilled in the art without the need for undue experimentation. In general, the amount of stabilized sweetening agent composition normally present in an edible composition will be up to about 1.5%, preferably from about 0.001% to about 1%, and more preferably from about 0.005% to about 0.4%, by weight of the edible composition.

The present invention extends to methods of making the ingestible compositions. In such a method, a composition is made by admixing an effective amount of the stabilized sweetening agent composition of the present invention with a pharmaceutically acceptable carrier or confectionery material and the other ingredients of the final desired ingestible composition. Other ingredients will usually be incorporated into the composition as dictated by the nature of the desired composition as well known by those having ordinary skill in the art. The ultimate ingestible compositions are readily prepared using methods generally known in the food technology and pharmaceutical arts.

In another embodiment, the present invention is directed at a method for sweetening an edible composition which comprises adding to the edible composition an effective amount of a stabilized sweetening agent composition in powder form wherein the stabilized sweetening agent composition comprises a chlorodeoxysugar derivative and a stabilizing agent wherein the stabilizing agent is capable of forming a stabilizing mixture with the chlorodeoxysugar derivative.

An important aspect of the present invention includes an improved chewing gum composition incorporating the inventive stabilized sweetening agent composition and a method for preparing the chewing gum composition, including both chewing gum and bubble gum formulations. In general, the improved chewing gum compositions will contain a gum base, a bulking agent, an effective amount of the inventive stabilized sweetening agent composition, and various additives such as a flavoring agent.

The chewing gum compositions may be reduced-calorie chewing gums employing high levels of a chewing gum base having an enhanced hydrophilic character. These reduced-calorie chewing gums will comprise a gum base present in an amount from about 50% to about 85%, preferably from about 50% to about 75%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low stabilizing agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In one embodiment, the reduced-calorie chewing gum composition comprises a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

Chewing gum compositions employing a high level of a chewing gum base having an enhanced hydrophilic character are more fully described in U.S. Pat. No. 4,872,884, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive stabilized sweetening agent composition and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 85%, preferably from about 50% to about 75%, and more preferably from about 60% to about 70%, by weight of the chewing gum composition.

In another embodiment, the chewing gum composition contains lower amounts of a chewing gum base. In general, the gum base in these chewing gum compositions will be present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the stabilized sweetening agent composition of the present invention and conventional additives such as a bulking agent and flavoring agent to prepare a wide variety of chewing gum compositions.

In addition to the gum base, the chewing gum composition may include a bulking agent. These bulking agents (carriers, extenders) may be water-soluble and include bulking agents selected from the group consisting of, but not limited to, monosaccharides, disaccharides, polysaccharides, sugar alcohols, and mixtures thereof; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 60%, and preferably in amounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetener, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be used individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the stabilized sweetening agent compositions of the present invention may be admixed into the chewing gum composition. As set out above, the stabilized sweetening agent compositions of the present invention comprise a chlorodeoxysugar derivative and an effective amount of a stabilizing agent. The exact amount of stabilized sweetening agent composition employed is normally a matter of preference subject to such factors as the particular type of gum composition being prepared, the type of bulking agent employed, the type of flavor employed and the intensity of sweetness desired. Thus, the amount of stabilized sweetening agent composition may be varied in order to obtain the result desired in the final product and such variations are within the capabilities of those skilled in the art without the need for undue experimentation. In general, the amount of stabilized sweetening agent composition normally present in a chewing gum composition will be up to about 1.5%, preferably from about 0.001% to about 1%, and more preferably from about 0.005% to about 0.4%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the stabilized sweetening agent composition and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive stabilized sweetening agent composition, plasticizer, the softener, the bulking agent, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

Another important aspect of the present invention includes a sweetened confectionery composition incorporating the inventive stabilized sweetening agent composition and a method for preparing the sweetened confectionery compositions. The preparation of confectionery formulations is historically well known and has changed little through the years. Confectionery items have been classified as either "hard" confectionery or "soft" confectionery. The stabilized sweetening agent compositions of the present invention can be incorporated into the confections by admixing the inventive composition into the conventional hard and soft confections.

Hard confectionery may be processed and formulated by conventional means. In general, a hard confectionery has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% corn syrup, up to about 55% sugar and from about 0.1% to about 5% water, by weight of the final composition. The syrup component is generally prepared from corn syrups high in fructose, but may include other materials. Further ingredients such as flavorings, sweeteners, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additives such as flavors, colorants and the like.

A high-speed atmospheric cooker uses a heat-exchanger surface which involves spreading a film of candy on a heat exchange surface, the candy is heated to 165° C. to 170° C. in a few minutes. The candy is then rapidly cooled to 100° C. to 120° C. and worked as a plastic-like mass enabling incorporation of the additives, such as flavors, colorants and the like.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavors, colorants, and other additives are admixed in the mass by routine mechanical mixing operations.

The optimum mixing required to uniformly mix the flavors, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets*, Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavors, colorants and so forth.

Similar to hard confectionery, soft confectionery may be utilized in this invention. The preparation of soft confections, such as nougat, involves conventional methods, such as the combination of two primary components, namely (i) a high boiling syrup such as a corn syrup, or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent such as a Polydextrose. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, *Chocolate, Cocoa and Confectionery: Science and Technology*, 2nd edition, AVI Publishing Co., Inc., Westport, Conn. (1980), at pages 424–425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

In accordance with this invention, effective amounts of the stabilized sweetening agent compositions of the present invention may be admixed into the hard and soft confections. As set out above, the stabilized sweetening agent composition of the present invention comprises a chlorodeoxysugar derivative and an effective amount of a stabilizing agent. The exact amount of stabilized sweetening agent composition may be varied in order to obtain the result desired in the final product and such variations are within the capabilities of those skilled in the art without the need for undue experimentation. The exact amount of stabilized sweetening agent composition employed is normally a matter of preference subject to such factors as the particular type of confection being prepared, the type of bulking agent or carrier employed, the type of flavor employed and the intensity of sweetness desired. Thus, the amount of stabilized sweetening agent composition may be varied in order to obtain the result desired in the final product and such variations are within the capabilities of those skilled in the art without the need for undue experimentation. In general, the amount of stabilized sweetening agent composition normally present in a hard or soft confection will be up to about 1.5%, preferably from about 0.001% to about 1%, and more preferably from about 0.005% to about 0.4%, by weight of the confection.

The present invention extends to methods of making the improved sweetened confections. The stabilized sweetening agent compositions may be incorporated into an otherwise conventional hard or soft confection composition using standard techniques and equipment known to those skilled in the art. The apparatus useful in accordance with the present invention comprises mixing and heating apparatus well known in the confectionery manufacturing arts, and therefore the selection of the specific apparatus will be apparent to the artisan.

In such a method, a composition is made by admixing the inventive stabilized sweetening agent composition into the confectionery composition along with the other ingredients of the final desired composition. Other ingredients will usually be incorporated into the composition as dictated by the nature of the desired composition as well known by those having ordinary skill in the art. The ultimate confectionery compositions are readily prepared using methods generally known in the food technology and pharmaceutical arts. Thereafter the confectionery mixture may be formed into desirable confectionery shapes.

The stabilized sweetening agent compositions may be formulated with conventional ingredients which offer a variety of textures to suit particular applications. Such ingredients may be in the form of hard and soft confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such confections and chewing gum products is well known.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES 1–46

These examples demonstrate a comparison of the relative stability of mixtures of Sucralose and various solid compounds during storage.

The test compositions in Examples 1–46 had the compositions set out in Tables 1 through 7. Each sample contained approximately 4.5 grams of Sucralose and was admixed with the solid compound in the ratio set out below.

TABLE 1

| Example | SUCRALOSE MIXTURES Ingredient | Ratio by Weight |
|---|---|---|
| 1 | Sucralose | CONTROL |
| 2 | Sucrose | CONTROL |
| 3 | Cellulose | CONTROL |
| 4 | Palatinit | CONTROL |
| 5 | Sucralose:Sucrose | 9:1 |
| 6 | Sucralose:Cellulose | 9:1 |
| 7 | Sucralose:Palatinit | 9:1 |

TABLE 2

| Example | SUCRALOSE MIXTURES Ingredient | Ratio by Weight |
|---|---|---|
| 8 | Sucralose | CONTROL |
| 9 | Maltitol | CONTROL |
| 10 | Microcellulose | CONTROL |
| 11 | Syloid | CONTROL |
| 12 | Sucralose:Maltitol | 9:1 |
| 13 | Sucralose:Microcellulose | 9:1 |
| 14 | Sucralose:Syloid | 9:1 |

TABLE 3

| Example | SUCRALOSE MIXTURES Ingredient | Ratio by Weight |
|---|---|---|
| 15 | Sucralose | CONTROL |
| 16 | Cellulose BW-300 | CONTROL |
| 17 | Cellulose BW-40 | CONTROL |
| 18 | Cellulose UF-900 | CONTROL |
| 19 | Sucralose:Cellulose BW-300 | 9:1 |
| 20 | Sucralose:Cellulose BW-40 | 9:1 |
| 21 | Sucralose:Cellulose UF-900 | 9:1 |

TABLE 4

| Example | SUCRALOSE MIXTURES Ingredient | Ratio by Weight |
|---|---|---|
| 22 | Sucralose | CONTROL |
| 23 | Sugar 6X | CONTROL |
| 24 | Mannitol | CONTROL |
| 25 | Sucralose:Sugar 6X | 9:1 |
| 26 | Sucralose:Mannitol | 9:1 |

TABLE 5

| Example | SUCRALOSE MIXTURES Ingredient | Ratio by Weight |
|---|---|---|
| 27 | Sucralose | CONTROL |
| 28 | Dicalcium Phosphate | CONTROL |
| 29 | Calcium Carbonate | CONTROL |
| 30 | Starch | CONTROL |
| 31 | Sucralose:Dicalcium Phosphate | 9:1 |
| 32 | Sucralose:Calcium Carbonate | 9:1 |

TABLE 5-continued

| Example | SUCRALOSE MIXTURES Ingredient | Ratio by Weight |
|---|---|---|
| 33 | Sucralose:Starch | 9:1 |

TABLE 6

| Example | SUCRALOSE MIXTURES Ingredient | Ratio by Weight |
|---|---|---|
| 34 | Sucralose | CONTROL |
| 35 | Sucralose:Cellulose BW-300 | 9:1 |
| 36 | Sucralose:Starch | 9:1 |
| 37 | Sucralose:Carboxymethyl Cellulose | 9:1 |
| 38 | Sucralose:Sodium Alginate | 9:1 |
| 39 | Sucralose:Talc | 9:1 |
| 40 | Sucralose:Polydextrose | 9:1 |

TABLE 7

| Example | SUCRALOSE MIXTURES Ingredient | Ratio by Weight |
|---|---|---|
| 41 | Sucralose | CONTROL |
| 42 | Sucralose:Cellulose BW-300 | 9:1 |
| 43 | Sucralose:Cellulose BW-300 | 8:2 |
| 44 | Sucralose:Cellulose BW-300 | 6:4 |
| 45 | Sucralose:Cellulose BW-300 | 5:5 |
| 46 | Sucralose:Cellulose BW-300 | 4:6 |

The compositions of examples 1–46 were stored in an oven at 45° C. (113° F.) under otherwise ambient conditions to accelerate degradation. The color of the Sucralose mixtures was then rated on a daily basis on a scale from 1 (white) to 10 (brown). When the color of the Sucralose mixture was rated 5, the mixture was considered to be unacceptable. The results of the stability studies are set out in Table 8 below and in FIGS. 1–7.

TABLE 8

| Example | Ingredient/Ratio | Days to Unacceptable |
|---|---|---|
| 1, 8, 15, 22, 27, 34, 41 | Sucralose | 5 days |
| 19, 42 | Sucralose/Cellulose BW-300 9:1 | 10 days |
| 23 | Sucralose/Sugar 6X 9:1 | 6 days |
| 7 | Sucralose/Palatinit 9:1 | 6 days |
| 12 | Sucralose/Maltitol 9:1 | 5 days |
| 13 | Sucralose/Microcellulose 9:1 | 6 days |
| 14 | Sucralose/Syloid 9:1 | 5 days |
| 20 | Sucralose/Cellulose BW-40 9:1 | 6 days |
| 21 | Sucralose/Cellulose UF-900 9:1 | 7 days |
| 12 | Sucralose/Mannitol 9:1 | 6 days |
| 31 | Sucralose/Dicalcium Phosphate 9:1 | 11 days |
| 32 | Sucralose/Calcium Carbonate 9:1 | 13 days |
| 33 | Sucralose/Starch 9:1 | 9 days |
| 37 | Sucralose/CMC 9:1 | 10 days |
| ? | Sucralose/Maltodextrin 9:1 | 6 days |
| 38 | Sucralose/Sodium Alginate 9:1 | 6 days |
| 39 | Sucralose/Talc 9:1 | 6 days |
| 40 | Sucralose/Polydextrose 9:1 | 6 days |

Figure 1:
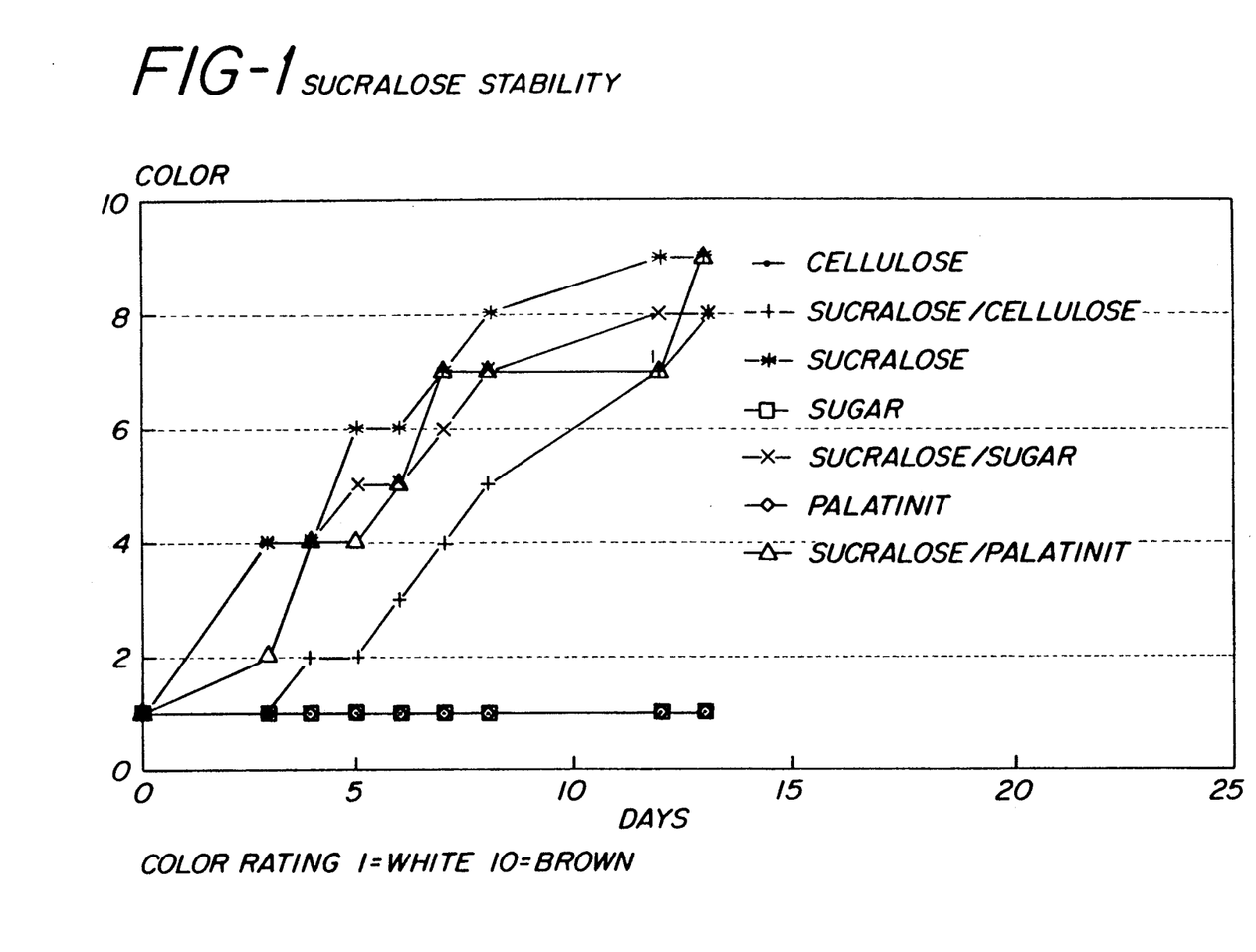
FIG. 1 depicts in graphic format the stability of mixtures of Sucralose and cellulose, sugar, and Palatinit at 45° C. versus time (Examples 1-7).

FIG. 1 shows that the stability of Sucralose in combination with cellulose, sugar, and Palatinit (Examples 1–7) at 45° C. is slightly better than the stability of Sucralose alone. The Sucralose control sample (Example 1) was decomposed (color rating of 6) at the end of 5 days.

Figure 2:
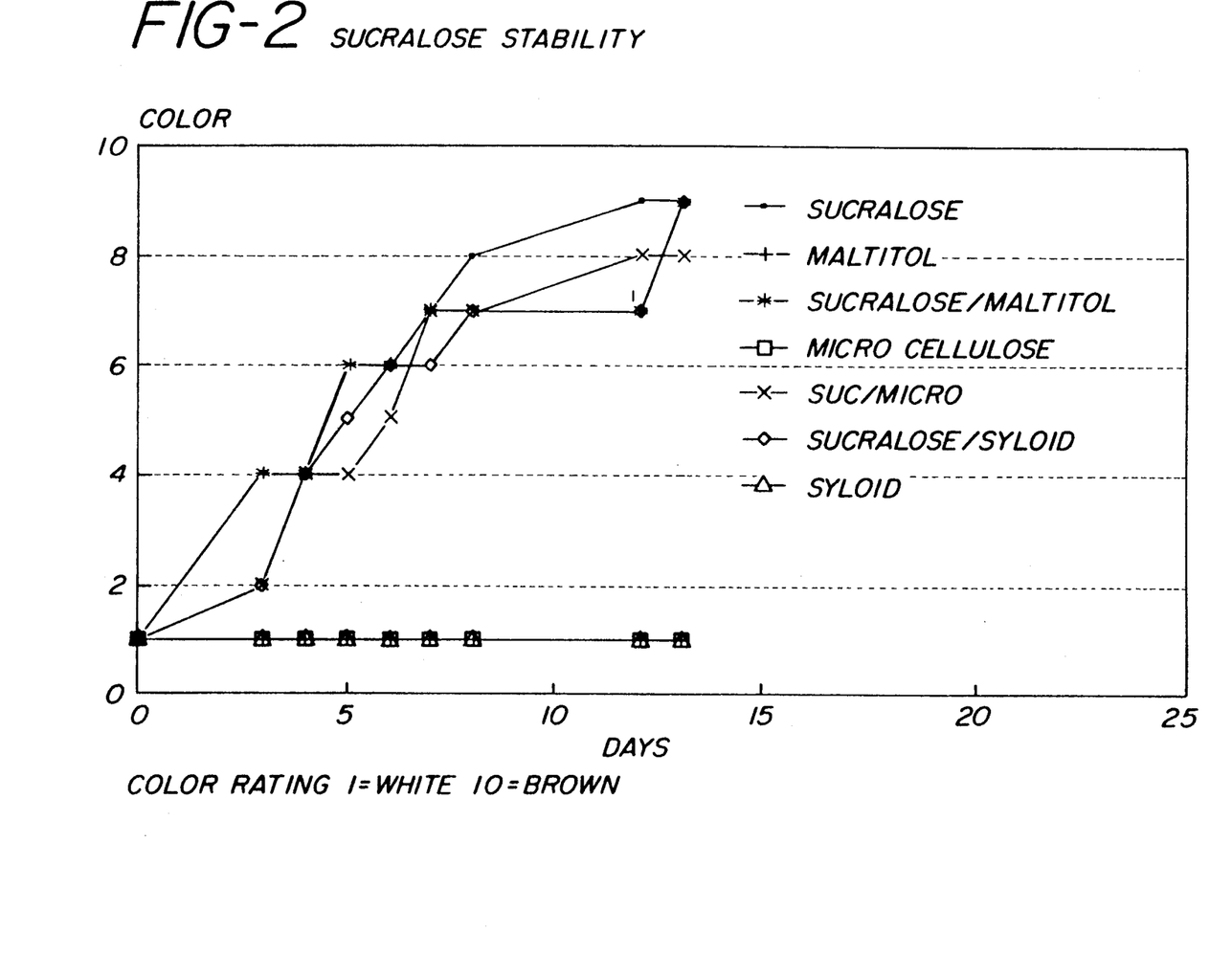
FIG. 2 depicts in graphic format the stability of mixtures of Sucralose and maltitol, microcellulose, and syloid at 45° C. versus time (Examples 8-14).

FIG. 2 shows that the stability of Sucralose in combination with maltitol, microcellulose, and syloid (Examples 8-14) at 45° C. is marginally better than the stability of Sucralose alone. None of the compounds in this group had a significant stabilizing effect upon Sucralose.

Figure 3:
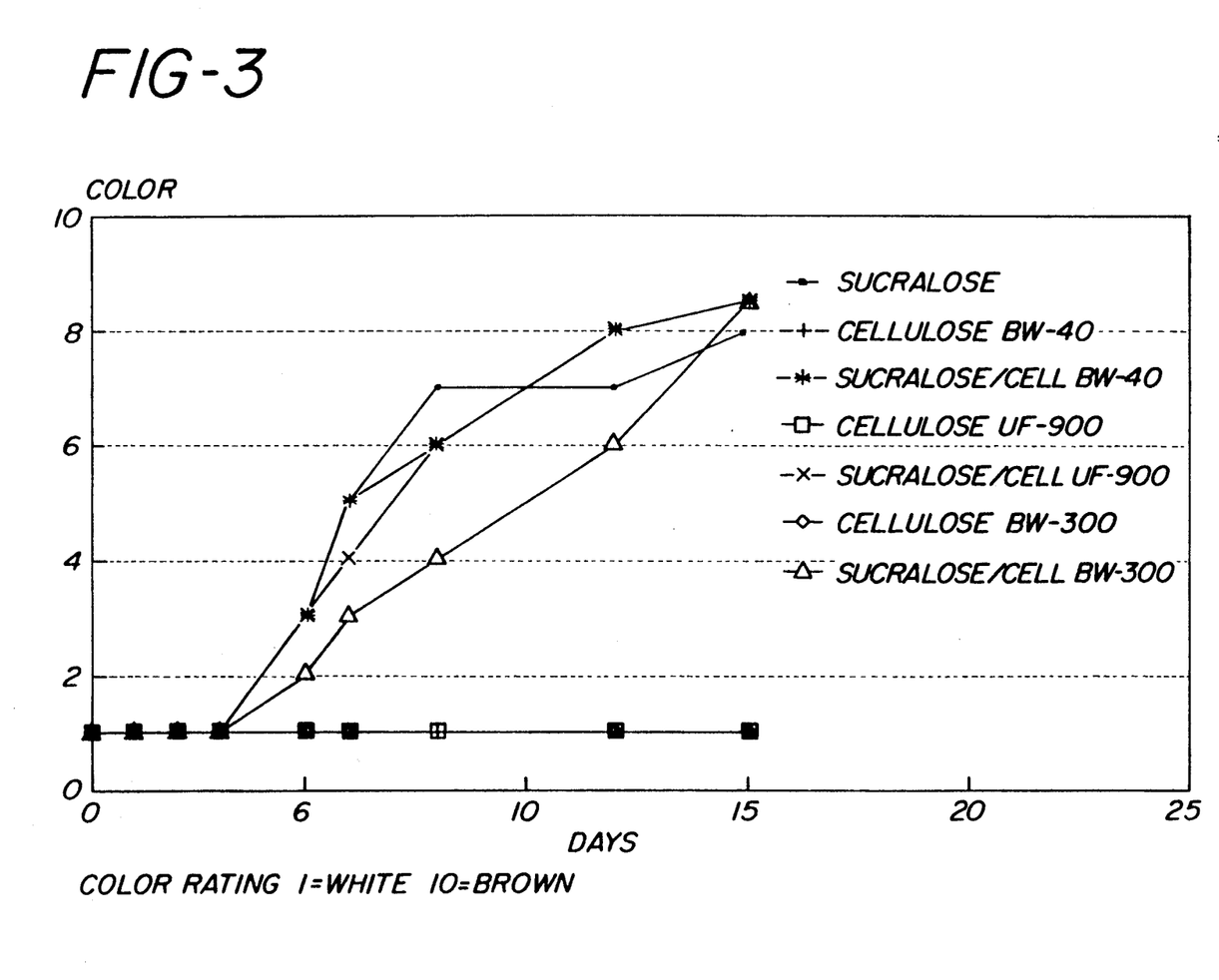
FIG. 3 depicts in graphic format the stability of mixtures of Sucralose and cellulose BW-40, cellulose UF-900, and cellulose BW-300 at 45° C. versus time (Examples 15-21).

FIG. 3 shows that the stability of Sucralose in combination with cellulose BW-40, cellulose UF-900 and cellulose BW-300 (Examples 15-21) at 45° C. is significantly better than the stability of Sucralose alone. None of the mixtures of Sucralose in this group were decomposed (color rating of 5) at the end of 5 days. In this group, cellulose BW-300 (which has the smallest particle size) had the most stabilizing effect upon Sucralose.

Figure 4:
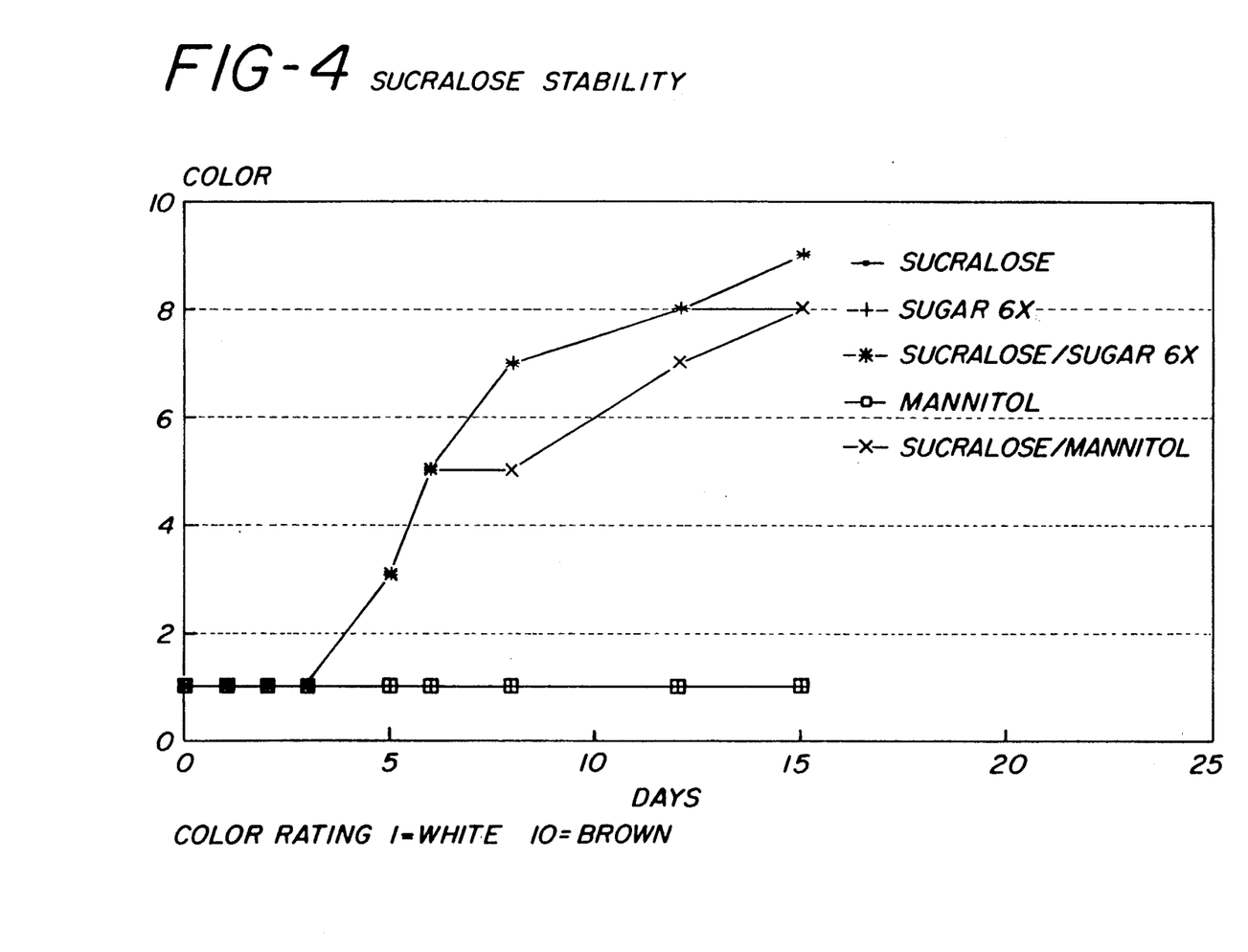
FIG. 4 depicts in graphic format the stability of mixtures of Sucralose and mannitol and sugar 6× at 45° C. versus time (Examples 22-26).

FIG. 4 shows that the stability of Sucralose in combination with sugar 6X (Examples 22-26) at 45° C. is not significantly better than the stability of Sucralose alone. FIG. 4 also shows that while the stability of Sucralose in combination with mannitol was not initially improved, the stability improved over time. For example, after the color of the mixture reached a color rating of 5, the color of the mixture appeared to stabilize and did not further deteriorate.

Figure 5:
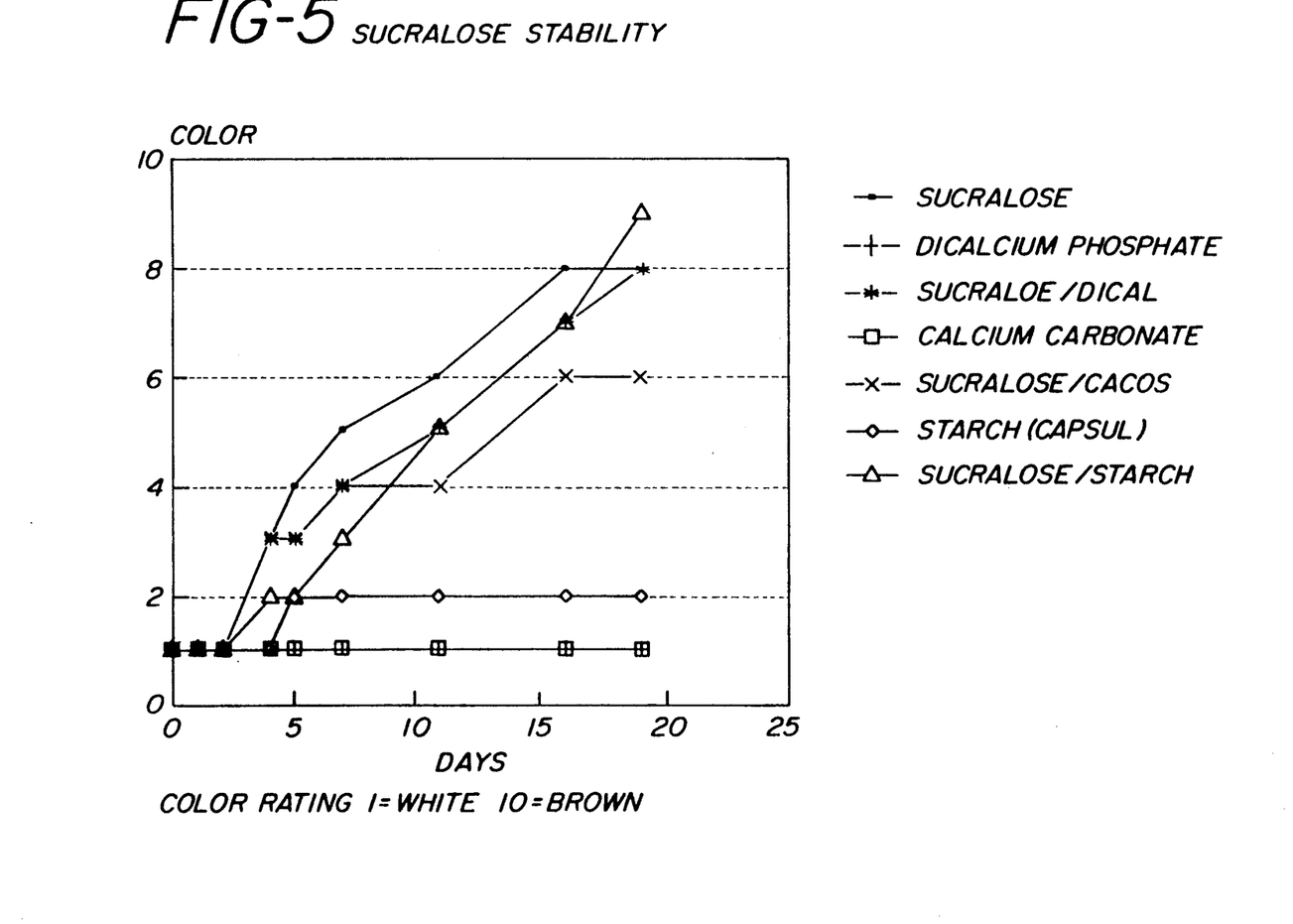
FIG. 5 depicts in graphic format the stability of mixtures of Sucralose and dicalcium phosphate, calcium carbonate and starch at 45° C. versus time (Examples 27-33).

FIG. 5 shows that the stability of Sucralose in combination with dicalcium phosphate, calcium carbonate and starch (Examples 27-33) at 45° C. is significantly better than the stability of Sucralose alone. None of the mixtures of Sucralose in this group were decomposed (color rating of 5) at the end of 5 days. In this group, starch had the most stabilizing effect upon Sucralose.

Figure 6:
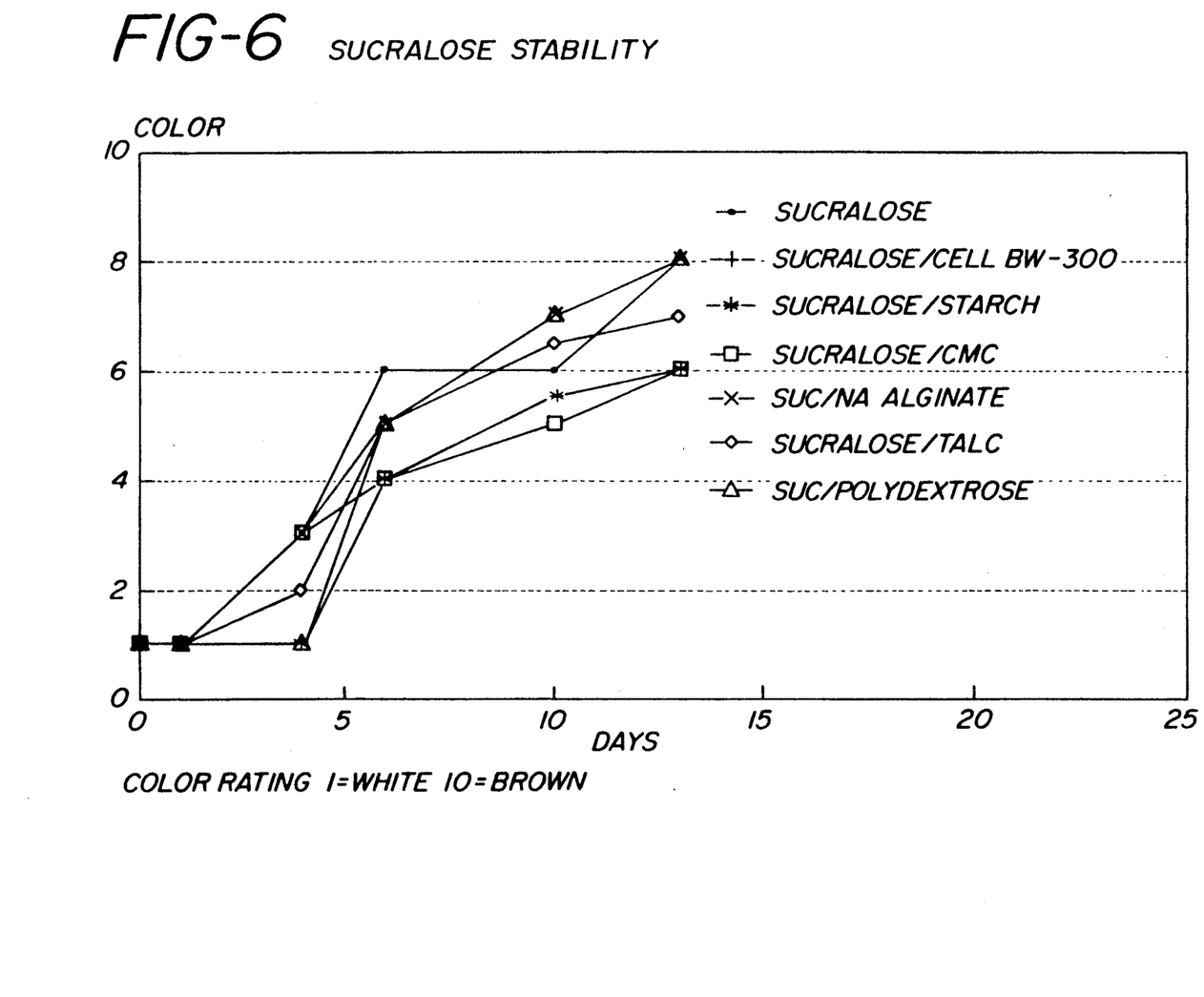
FIG. 6 depicts in graphic format the stability of mixtures of Sucralose and cellulose BW-300, starch, carboxymethyl cellulose, sodium alginate, talc, and Polydextrose at 45° C. versus time (Examples 34-40).

FIG. 6 shows that the stability of Sucralose in combination with cellulose BW-300, starch carboxymethyl cellulose, sodium alginate, talc, and Polydextrose at 45° C. (Examples 34-40) at 45° C. is varied compared to the stability of Sucralose alone. The stability of the mixtures of Sucralose with cellulose BW-300, starch, and carboxymethyl cellulose are significantly better than the stability of Sucralose alone. The stability of the mixtures of Sucralose with sodium alginate, talc, and Polydextrose are somewhat better than the stability of Sucralose alone.

Figure 7:
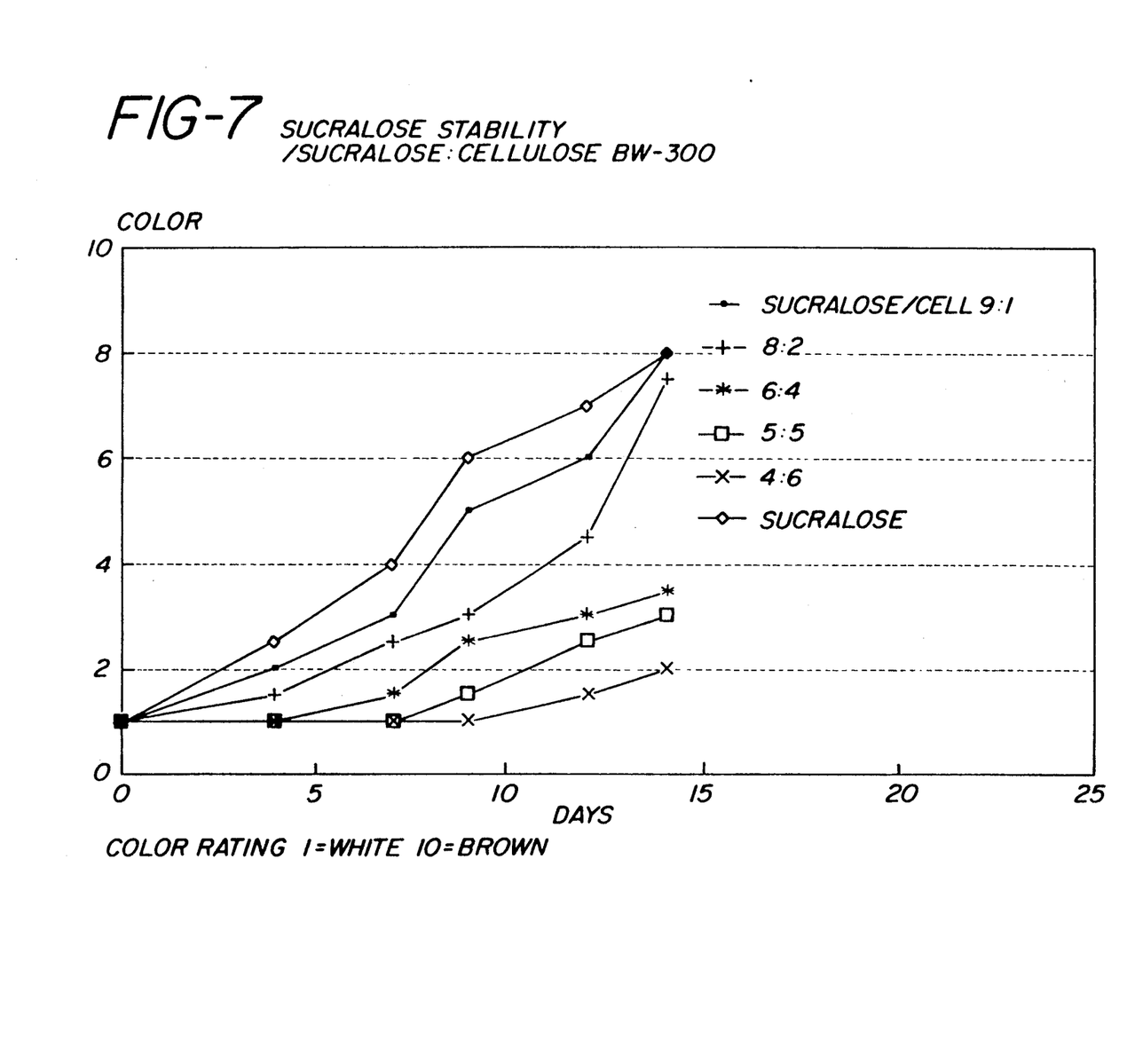
FIG. 7 depicts in graphic format the stability of mixtures of Sucralose and cellulose BW-300 at various weight ratios at 45° C. versus time (Examples 41-46).

FIG. 7 shows that the stability of Sucralose in combination with cellulose BW-300 at various weight ratios (Examples 41-46) at 45° C. increases with increasing amount of cellulose BW-300 up until a weight ratio of Sucralose to cellulose BW-300 of about 5:5 to about 4:6, respectively.

Accordingly, FIGS. 1 through 7 show that mixtures of Sucralose with cellulose BW-300, calcium carbonate, dicalcium phosphate, carboxymethyl cellulose, and starch are more stable than Sucralose alone or mixtures of Sucralose with other compounds which do not have a stabilizing effect on Sucralose.

While the invention has been particularly described in terms of specific embodiments, invention is to be broadly construed and limited only by the scope and spirit of the following claims.

We claim:

1. A heat stabilized chlorodeoxysugar sweetening agent composition in powder form which comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof.

2. The stabilized sweetening agent composition according to claim 1, wherein the chlorodeoxysugar derivative is selected from the group consisting of chlorodeoxysucrose derivatives, chlorodeoxygalacto-sucrose derivatives, and mixtures thereof.

3. The stabilized sweetening agent composition according to claim 2, wherein the chlorodeoxysugar derivative is 4,1',6'-trichloro-4,1',6'-trideoxygalactosucrose.

4. The stabilized sweetening agent composition according to claim 1, wherein the stabilizing agent is cellulose BW-300.

5. The stabilized sweetening agent composition according to claim 1, wherein the stabilizing agent is present in the sweetening agent composition in an amount of at least about 10%, by weight of the sweetening agent composition.

6. The stabilized sweetening agent composition according to claim 5, wherein the stabilizing agent is present in the sweetening agent composition in an amount from about 10% to about 50%, by weight of the sweetening agent composition.

7. The stabilized sweetening agent composition according to claim 6, wherein the stabilizing agent is present in the sweetening agent composition in an amount from about 10% to about 30%, by weight of the sweetening agent composition.

8. An edible composition which comprises a pharmaceutically acceptable carrier and an effective amount of a heat stabilized sweetening agent composition in powder form wherein the stabilized sweetening agent composition comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof.

9. The edible composition according to claim 8, wherein the chlorodeoxysugar derivative is selected from the group consisting of chlorodeoxysucrose derivatives, chlorodeoxygalactosucrose derivatives, and mixtures thereof.

10. The edible composition according to claim 9, wherein the chlorodeoxysugar derivative is 4,1',6'-trichloro-4,1',6'-trideoxygalactosucrose.

11. The edible composition according to claim 9, wherein the stabilizing agent is cellulose BW-300.

12. The edible composition according to claim 8, wherein the stabilizing agent is present in the sweetening agent composition in an amount of at least about 10%, by weight of the sweetening agent composition.

13. The edible composition according to claim 12, wherein the stabilizing agent is present in the sweetening agent composition in an amount from about 10% to about 50%, by weight of the sweetening agent composition.

14. The edible composition according to claim 13, wherein the stabilizing agent is present in the sweetening agent composition in an amount from about 10% to about 30%, by weight of the sweetening agent composition.

15. The edible composition according to claim 8, wherein the stabilized sweetening agent composition is present in the edible composition in an amount up to about 1.5%, by weight of the edible composition.

16. A sweetening chewing gum composition which comprises:

(a) a gum base;

(b) a bulking agent;
(c) an effective amount of a heat stabilized sweetening agent composition in powder form which comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof; and
(d) a flavoring agent.

17. The sweetened chewing gum composition according to claim 16, wherein the chlorodeoxysugar derivative is selected from the group consisting of chlorodeoxysucrose derivatives, chlorodeoxygalactosucrose derivatives, and mixtures thereof.

18. The sweetened chewing gum composition according to claim 17, wherein the chlorodeoxysugar derivative is 4,1',6'-trichloro-4,1',6'-trideoxygalactosucrose.

19. The sweetened chewing gum composition according to claim 16, wherein the stabilizing agent is cellulose BW-300.

20. The sweetened chewing gum composition according to claim 16, wherein the stabilizing agent is present in the sweetening agent composition in an amount of at least about 10%, by weight of the sweetening agent composition.

21. The sweetened chewing gum composition according to claim 20, wherein the stabilizing agent is present in the sweetening agent composition in an amount from about 10% to about 50%, by weight of the sweetening agent composition.

22. The sweetened chewing gum composition according to claim 21, wherein the stabilizing agent is present in the sweetening agent composition in an amount from about 10% to about 30%, by weight of the sweetening agent composition.

23. The sweetened chewing gum composition according to claim 16, wherein the stabilized sweetening agent composition is present in the chewing gum composition in an amount up to about 1.5%, by weight of the chewing gum composition.

24. The sweetened chewing gum composition according to claim 16, wherein the gum base is present in an amount up to about 55%, by weight of the chewing gum composition.

25. The sweetened chewing gum composition according to claim 16, wherein the gum base is present in an amount from about 50% to about 85%, by weight of the chewing gum composition.

26. A sweetened confectionery composition which comprises an effective amount of a heat stabilized sweetening agent composition in powder form which comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof.

27. The sweetened confectionery composition according to claim 26, wherein the chlorodeoxysugar derivative is selected from the group consisting of chlorodeoxysucrose derivatives, chlorodeoxygalactosucrose derivatives, and mixtures thereof.

28. The sweetened confectionery composition according to claim 27, wherein the chlorodeoxysugar derivative is 4,1',6'-trichloro-4,1',6'-trideoxygalactosucrose.

29. The sweetened confectionery composition according to claim 26, wherein the stabilizing agent is cellulose BW-300.

30. The sweetened confectionery composition according to claim 26, wherein the stabilizing agent is present in the sweetening agent composition in an amount of at least about 10%, by weight of the sweetening agent composition.

31. The sweetened confectionery composition according to claim 30, wherein the stabilizing agent is present in the sweetening agent composition in an amount from about 10% to about 50%, by weight of the sweetening agent composition.

32. The sweetened confectionery composition according to claim 31, wherein the stabilizing agent is present in the sweetening agent composition in an amount from about 10% to about 30%, by weight of the sweetening agent composition.

33. The sweetened confectionery composition according to claim 26, wherein the stabilized sweetening agent composition is present in the confectionery composition in an amount up to about 1.5%, by weight of the confectionery composition.

34. A method for preparing a heat stabilized sweetening agent composition which comprises admixing in powder form a chlorodeoxysugar derivative and an effective amount of a stabilizing agent wherein the stabilizing agent is capable of forming a stabilizing mixture with the chlorodeoxysugar derivative.

35. A method for preparing a sweetened edible composition which comprises admixing an effective amount of a heat stabilized sweetening agent composition in powder form with a pharmaceutically acceptable carrier wherein the stabilized sweetening agent composition comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof.

36. A method for preparing a sweetened chewing gum composition which comprises
(A) providing the following ingredients:
  (a) a gum base;
  (b) a bulking agent;
  (c) an effective amount of a heat stabilized sweetening agent composition in powder form which comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof; and
  (d) a flavoring agent;
(B) melting the gum base;
(C) admixing the bulking agent and the stabilized sweetening agent composition with the melted gum base; and
(D) forming the mixture from step (C) into suitable gum shapes.

37. A method for sweetening an edible composition which comprises adding to the edible composition an effective amount of a heat stabilized sweetening agent composition in powder form wherein the stabilized sweetening agent composition comprises a chlorodeoxysugar derivative and an effective amount of a stabilizing agent wherein the stabilizing agent is selected from the group consisting of cellulose BW-300, calcium carbonate, dicalcium phosphate, carboxymethyl cellulose, starch, mannitol, and mixtures thereof.

* * * * *